(12) United States Patent
Ito et al.

(10) Patent No.: US 12,445,153 B2
(45) Date of Patent: Oct. 14, 2025

(54) WIRELESS COMMUNICATION SYSTEM, TRANSMISSION METHOD AND RECEPTION METHOD

(71) Applicant: HITACHI KOKUSAI ELECTRIC INC., Tokyo (JP)

(72) Inventors: Kei Ito, Tokyo (JP); Tatsuhiro Nakada, Tokyo (JP)

(73) Assignee: KOKUSAI DENKI Electric Inc., Tokyo (JP)

( * ) Notice: Subject to any disclaimer, the term of this patent is extended or adjusted under 35 U.S.C. 154(b) by 436 days.

(21) Appl. No.: 18/041,290

(22) PCT Filed: Sep. 10, 2020

(86) PCT No.: PCT/JP2020/034312
§ 371 (c)(1),
(2) Date: Feb. 10, 2023

(87) PCT Pub. No.: WO2022/054203
PCT Pub. Date: Mar. 17, 2022

(65) Prior Publication Data
US 2023/0238989 A1 Jul. 27, 2023

(51) Int. Cl.
*H04L 7/10* (2006.01)
*H04B 1/04* (2006.01)
(Continued)

(52) U.S. Cl.
CPC .............. *H04B 1/04* (2013.01); *H04B 1/16* (2013.01); *H04L 5/0048* (2013.01); *H04L 7/10* (2013.01); *H04B 2001/0408* (2013.01)

(58) Field of Classification Search
CPC .................................. H04L 7/10; H04B 1/16
(Continued)

(56) References Cited

U.S. PATENT DOCUMENTS

2003/0026363 A1* 2/2003 Stoter ................. H03G 3/3078
375/345

FOREIGN PATENT DOCUMENTS

JP H9-261292 A 10/1997
JP 2002-290177 A 10/2002
(Continued)

OTHER PUBLICATIONS

International Search Report dated Dec. 15, 2020.

*Primary Examiner* — Dang T Ton
(74) *Attorney, Agent, or Firm* — BACON&THOMAS,PLLC

(57) ABSTRACT

The present invention allows a gain control to be appropriately effected even when a frame including no preamble signal block is used for wireless communications. The following processes are effected in a transmission power control unit 106 of a transmission unit. Specifically, an automatic transmission gain control unit 201 multiplies a transmission signal by a gain value that is the difference between the power of a signal loop-backed from a power amplifier 109 and the power of the transmission signal. A fixed transmission gain multiplying unit 202 multiplies the transmission signal by a predetermined gain value or by the gain value used in the automatic transmission gain control unit 201 during the preceding frame. A selection unit 203 selects the transmission signal as gain-controlled by the automatic transmission gain control unit 201 in a case of a preamble signal block being included in the frame of the transmission signal and selects the transmission signal as gain-controlled by the fixed transmission gain multiplying unit 202 in a case of no preamble signal block being included in the frame of the transmission signal.

8 Claims, 7 Drawing Sheets

(51) Int. Cl.
*H04B 1/16* (2006.01)
*H04L 5/00* (2006.01)

(58) Field of Classification Search
USPC .......................................... 370/329, 401, 403
See application file for complete search history.

(56) References Cited

FOREIGN PATENT DOCUMENTS

| | | | |
|---|---|---|---|
| JP | 2003-244118 A | 8/2003 |
| JP | 2003-304296 A | 10/2003 |
| JP | 2005-236766 A | 9/2005 |

\* cited by examiner

WIRELESS COMMUNICATION SYSTEM, TRANSMISSION METHOD AND RECEPTION METHOD

TECHNICAL FIELD

The present disclosure relates to a wireless communication system that performs wireless communication using a frame capable of selecting whether or not a preamble signal block is included therein.

BACKGROUND

Generally, in a wireless communication system, some known preamble signal blocks are added to a head of a transmission frame of a physical layer. This preamble signal block is used for processing such as transmission gain control of a transmitter, reception automatic gain control of a receiver, synchronization acquisition, or the like. The numbers of preamble signal blocks, header signal blocks, known signal blocks for channel estimation, data symbol blocks, which are original data transmission part (actual data), or the like, are generally determined by a frame format.

Here, Patent Document 1 discloses an invention capable of reducing erroneous preamble detection while reducing the amount of processing required for preamble detection when a received signal is small. In addition, Patent Document 2 discloses an invention by which preamble detection can be accurately performed even when a C/N ratio of a propagation path is degraded.

PRIOR ART DOCUMENTS

Patent Documents

Patent Document 1: Japanese Laid-open Patent Publication No. 2003-244118
Patent Document 2: Japanese Laid-open Patent Publication No. 2003-304296

SUMMARY

Problems to be Resolved by the Invention

For example, in communication standards such as MIL-STD-188-110D, the number of preamble signal blocks can be set to any number including zero. In other words, there may be a frame that does not contain a preamble signal block. However, the sequences for transmission gain control, reception automatic gain control, synchronization acquisition, or the like in the case of using a frame that does not include a preamble signal block have not been sufficiently studied, and may require improvement.

The present disclosure has been made in view of the afore-said conventional problems, and one of the objectives of the present disclosure is to appropriately perform gain control even when a frame that does not include a preamble signal block is used for wireless communication.

Means of Solving the Problems

In order to achieve the above objectives, in the present disclosure, a wireless communication system is configured as follows.

In other words, the present disclosure relates to a wireless communication system in which a transmitter and a receiver perform wireless communication using a frame capable of selecting whether or not a preamble signal block that stores a preamble signal used for gain control included therein, and has the following technical features.

The transmitter comprises an automatic transmission gain controller configured to multiply a transmission signal by a gain value which is equivalent to a difference between a power of a signal looped back from a power amplifier of the transmitter and a power of a transmission signal, a fixed transmission gain multiplier configured to multiply the transmission signal by a predetermined gain value or a gain value used by the automatic transmission gain controller for a previous frame, and a transmission signal selector configured to select a transmission signal whose gain has been controlled by the automatic transmission gain controller when a frame of the transmission signal include a preamble signal block, and to select a transmission signal whose gain has been controlled by the fixed transmission gain multiplier when the frame of the transmission signal includes no preamble signal block.

The receiver comprises an automatic gain controller configured to multiply a reception signal by a gain value which is equivalent to a difference between a power of the reception signal and a target power, a fixed gain multiplier configured to multiply the reception signal by a predetermined gain or a gain value used by the automatic gain controller for the previous frame, and a reception signal selector configured co select a reception signal whose gain has been controlled by the automatic gain controller when a frame of the reception signal includes a preamble signal block, and to select a reception signal whose gain has been controlled by the fixed gain multiplier when the frame of the reception signal includes no preamble signal block.

The receiver comprises a preamble correlation calculator configured to perform correlation calculation between a preamble signal and the reception signal whose gain has been controlled by the automatic gain controller, and a preamble correlation threshold detector configured to determine whether or not a peak of a correlation value calculated by the preamble correlation calculator exceeds a predetermined peak, and the reception signal selector selects the reception signal whose gain has been controlled by the automatic gain controller when the preamble correlation threshold detector determines that the peak of the correlation value calculated by the preamble correlation calculator exceeds a predetermined threshold.

Further, the receiver comprises a header correlation calculator configured to perform correlation calculation between the reception signal whose gain has been controlled by the fixed gain multiplier and a parameter detection signal, and a header correlation threshold detector configured to determine whether or not a peak of a correlation value calculated by the header correlation calculator exceeds a predetermined threshold, and the reception signal selector selects the reception signal whose gain has been controlled by the fixed gain multiplier when the header correlation threshold detector determines that the peak of the correlation value calculated by the header correlation calculator exceeds the predetermined threshold.

In addition, the receiver comprises K-number of fixed gain multipliers having different predetermined gain values, and K-number of header correlation calculators and K-number of header correlation threshold detectors respectively corresponding to the K-number of fixed gain multipliers, and the reception signal selector selects a reception signal whose gain has been controlled by a $k^{th}$ (k=1 to M) fixed gain multiplier when a $k^{th}$ header correlation threshold detector determines that a peak of a correlation value calculated by a $k^{th}$ header correlation calculator exceeds a predetermined threshold.

The present disclosure can also be implemented as the following transmission method.

A transmitter, which transmits a signal to a receiver using a frame capable of selecting whether or not a preamble signal block for storing a preamble signal used for gain control is included therein, performs gain control in which a transmission signal is multiplied by a gain value which is equivalent to a difference between a power of a signal looped back from a power amplifier of the transmitter and a power of a transmission signal when a frame of the transmission signal includes a preamble signal block, and performs gain control in which a transmission signal is multiplied by a predetermined gain value or a gain value used for gain control of a transmission signal in a previous frame when the frame of the transmission signal includes no preamble signal block.

The present disclosure can also be implemented as the following reception method.

A receiver, which receives a signal transmitted from a transmitter using a frame capable of selecting whether or not a preamble signal block that stores a preamble signal used for gain control is included therein, performs gain control in which a reception signal is multiplied by a gain value which is equivalent to a difference between a power of the reception signal and a target power when a frame of the reception signal includes a preamble signal block, and performs gain control in which a reception signal is multiplied by a predetermined gain value or a gain value used for gain control of a reception signal in a previous frame when the frame of the reception signal includes no preamble signal block.

Effect of the Invention

In accordance with the present disclosure, it is possible to appropriately perform transmission gain control and reception gain control even when a frame that does not include a preamble signal block is used for wireless communication. Therefore, it is possible to provide wireless communication system capable of stably maintaining communication.

DETAILED DESCRIPTION

Hereinafter, a wireless communication system according to an embodiment of the present disclosure will be described with reference to the accompanying drawings.

Figure 1:
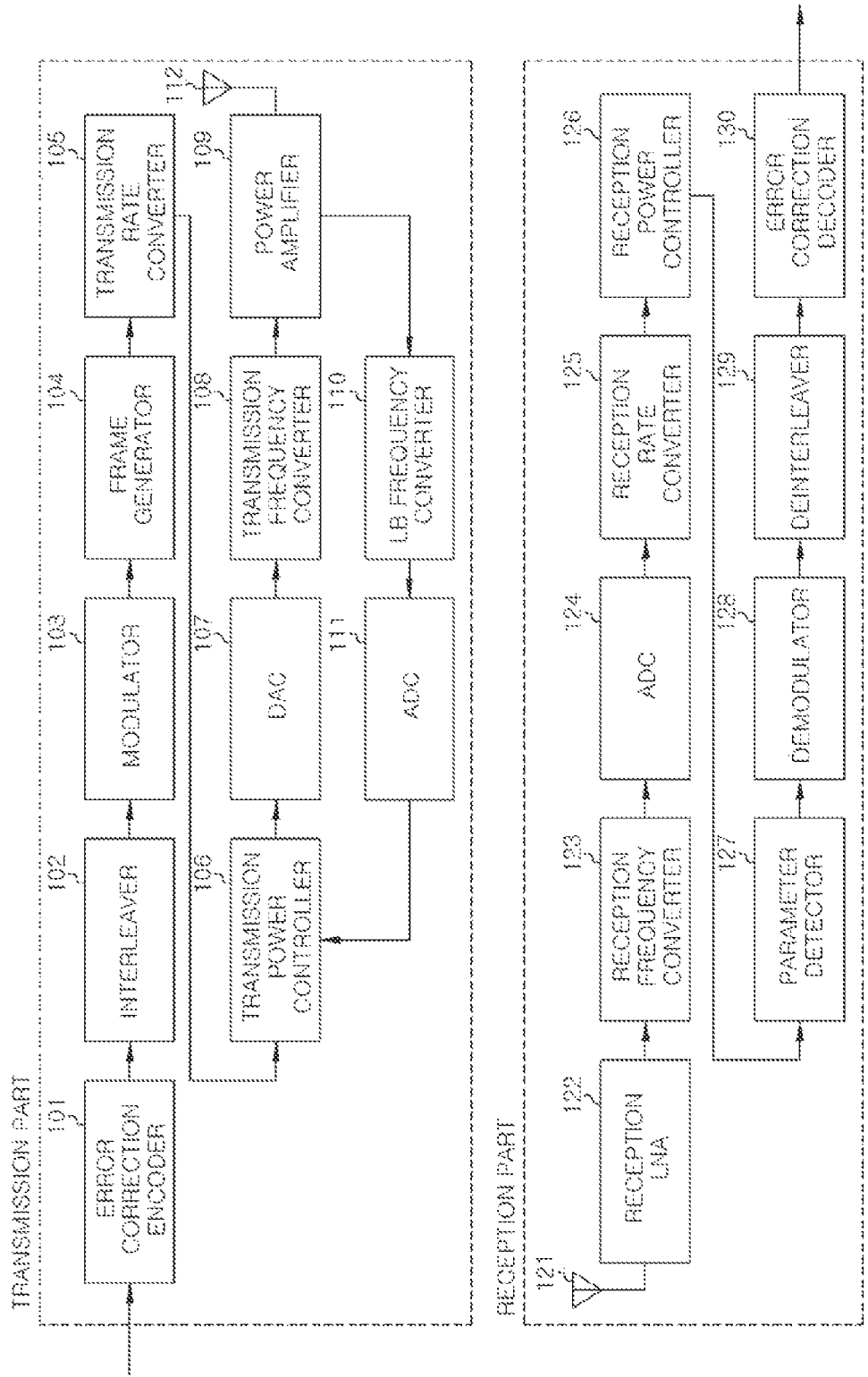
FIG. 1 shows a configuration example of a transmission part and a reception part of a wireless communication system according to a first embodiment.

FIG. 1 shows a configuration example of a transmission part and a reception part of a wireless communication system according to a first embodiment of the present disclosure. The wireless communication system according to the first embodiment includes a transmission part (transmitter) installed in a transmission-side device and a reception part (receiver) installed in a reception-side device.

The transmission part includes an error correction encoder 101, an interleaver 102, a modulator 103, a frame generator 104, transmission rate converter 105, a transmission power controller 106, a digital-analog converter (DAC) 107, a transmission frequency converter 108, a power amplifier 109, a loopback (LB) frequency converter 110, an analog-digital converter (ADC) 111, and a transmission antenna 112.

The reception part includes a reception antenna 121, a reception low noise amplifier (LNA) 122, a reception frequency converter 123, an ADC 124, a reception rate converter 125, a reception power controller 126, a parameter detector 127, a demodulator 128, a deinterleaver 129, and an error correction decoder 120.

A transmission information bit sequence (transmission data) outputted from a higher layer is inputted to the error correction encoder 101. The error correction encoder 101 performs error correction encoding on the inputted transmission information bit sequence. The encoded bit sequence obtained by the error correction encoder is outputted to the interleaver 102.

The interleaver 102 performs interleaving processing for rearranging the inputted encoded bit sequence in a predetermined order. The modulated bit sequence obtained by the interleaving processing is outputted to the modulator 103.

The modulator 103 performs modulation processing based on a predetermined modulation method on the inputted modulated bit sequence. The modulation signal obtained by the modulation processing is outputted to the frame generator 104.

The frame generator 104 stores the inputted modulation signal in a frame or a predetermined format. This frame also stores a preamble signal, a signal for parameter detection, a known signal for channel estimation, or the like. The preamble signal is used for processing such as transmission gain control of the transmitter, reception automatic gain control of the receiver, synchronization acquisition, or the like. The parameter detection signal is used to transmit a parameter such as a modulation method, an interleave size, or the like to the reception side. The parameter detection signal is defined as a code value indicating combination of the modulation method, the interleave size, or the like, for example, and one of code values of multiple patterns is set. The known signal for channel estimation is used for channel estimation processing.

Figure 2:
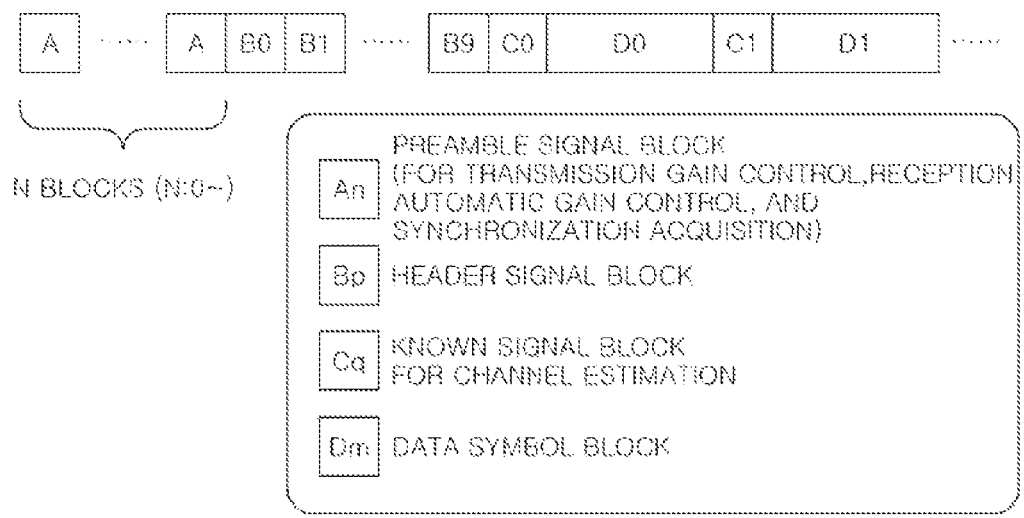
FIG. 2 shows an example of a frame format to which the present disclosure can be applied.

A frame to which the present disclosure can be applied has a format as shown in FIG. 2, for example. The frame shown in FIG. 2 includes a preamble signal block An (n=0 to N) in which a preamble signal is stored, a header signal block Bp (p=0 to P) in which a parameter detection signal is stored, a known signal block Cq (q=0 to Q) in which a known signal for channel estimation is stored, and a data symbol block Dm (m=0 to M) in which a modulation signal of transmission data is stored. The frame generated by frame generator 104 is outputted to the transmission rate converter 105.

The transmission rate converter 105 performs conversion processing from a modulation sampling rate to a DAC sampling rate on the entire frame including the modulation signal. The frame signal (i.e., transmission signal) whose sampling rate has been converted is outputted to the transmission power controller 106.

The transmission power controller 106 controls a power to a predetermined transmission output power using the inputted transmission signal and the signal looped back from the power amplifier 109 for automatic power control via the LB frequency converter 110 and the ADC 111. The transmission signal whose power has been controlled is outputted to the DAC 107.

Figure 3:
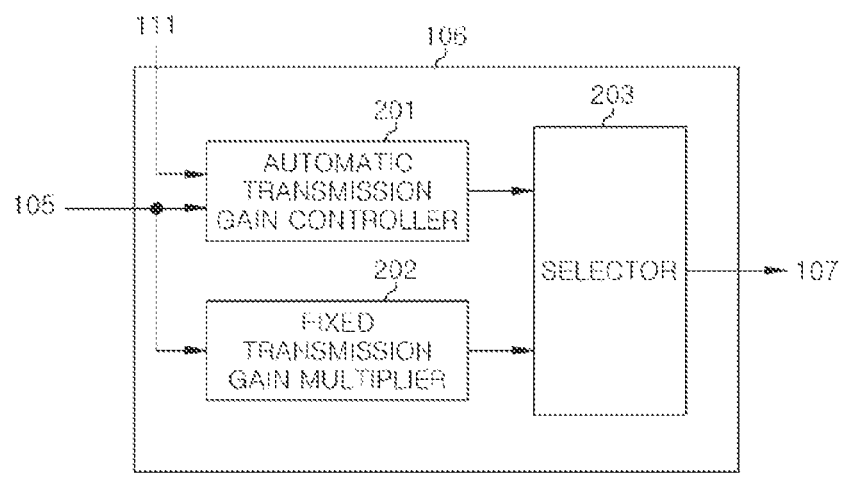
FIG. 3 shows a configuration example of a transmission power controller in the first and second embodiments.

The transmission power controller 106 will be described in detail with reference to FIG. 3. As shown in FIG. 3, the transmission power controller 106 in this example includes an automatic transmission gain controller 201, fixed transmission gain multiplier 202, and a selector 203.

The automatic transmission gain controller 201 performs processing for absorbing individual differences or temperature characteristics of the gain of the power amplifier 109. In other words, the automatic transmission gain controller 201 calculates the difference between the power of the inputted transmission signal and the power of the loopback signal from the power amplifier 109, multiplies the transmission signal by the differential gain, and outputs the result to the selector 203.

The fixed transmission gain multiplier 202 multiplies the inputted transmission signal by a predetermined gain value (e.g., 10 dB) or the gain value calculated by the automatic transmission gain controller 201 in a previous frame, and outputs the result to the selector 203. In this example, if the gain value has been calculated by the automatic transmission gain controller 201 in the previous frame, the gain value is multiplied by the transmission signal. Otherwise, the transmission signal is by the predetermined gain value.

When the number N of preamble signal blocks in the current frame is 0, that is, when the frame does not include the preamble signal block, the selector 203 selects the output signal of the fixed transmission gain multiplier 202 and outputs it to the DAC 107. When the number N of preamble signal blocks in the current frame is greater than 0, that is, when the frame includes a preamble signal block, the selector 203 selects the output signal of the automatic transmission gain controller 201 and outputs it to the DAC 107.

The DAC 107 converts the inputted transmission signal from a digital signal to an analog signal in a predetermined voltage range. The transmission signal converted to the analog signal is outputted to the transmission frequency converter 108.

The transmission frequency converter 108 performs frequency conversion so that the inputted transmission signal converted from a baseband frequency signal to a transmission radio frequency signal. The transmission signal whose frequency has been converted is outputted to the power amplifier 109.

The power amplifier 109 amplifies the inputted transmission signal to the power required by the wireless system. The transmission signal whose power has been amplified is outputted to the transmission antenna 112. Further, the power amplifier 109 attenuates the transmission signal to be outputted to the transmission antenna 112 by a predetermined gain, and outputs the attenuated signal as a loopback signal to the LB frequency converter 110.

The LB frequency converter 110 performs frequency conversion so that the loopback signal is converted from the power amplifier 109 from a transmission radio frequency signal to a baseband frequency signal. The loopback signal whose frequency has been converted is outputted to the ADC 111.

The ADC 111 converts an analog signal to a digital signal having a predetermined number of bits samples by sampling the inputted loopback signal at a predetermined sampling rate. The loopback signal converted to a digital signal is outputted to the transmission power controller 106.

The transmission antenna 112 radiates the inputted radio frequency signal into a space.

The reception antenna 121 receives the radio frequency signal radiated from the transmission antenna 112 and outputs the received signal to the reception LNA 122.

The reception LNA 122 amplifies the inputted reception signal using a low noise amplifier. The reception signal whose power has been amplified is outputted to the reception frequency converter 123.

The reception frequency converter 123 performs frequency conversion to convert the inputted reception signal to a baseband frequency signal. The reception signal whose frequency has been converted is outputted to the ADC 124.

The ADC 124 converts an analog signal to a digital signal having a predetermined number of bits by sampling the inputted reception signal at a predetermined sampling rate. The reception signal converted to the digital signal is outputted to the reception rate converter 125.

The reception rate converter 125 performs conversion processing from the ADC sampling rate to the modulation sampling rate on the inputted reception signal. The reception signal whose sampling rate has been converted is outputted to the reception power controller 126.

The reception power controller 126 calculates the power of the reception signal, calculates the gain, for achieving a prescribed target power, and multiplies the reception signal by the gain in order to perform subsequent processing at a constant signal level. The reception signal whose power has been controlled is outputted to the parameter detector 127.

Figure 4:
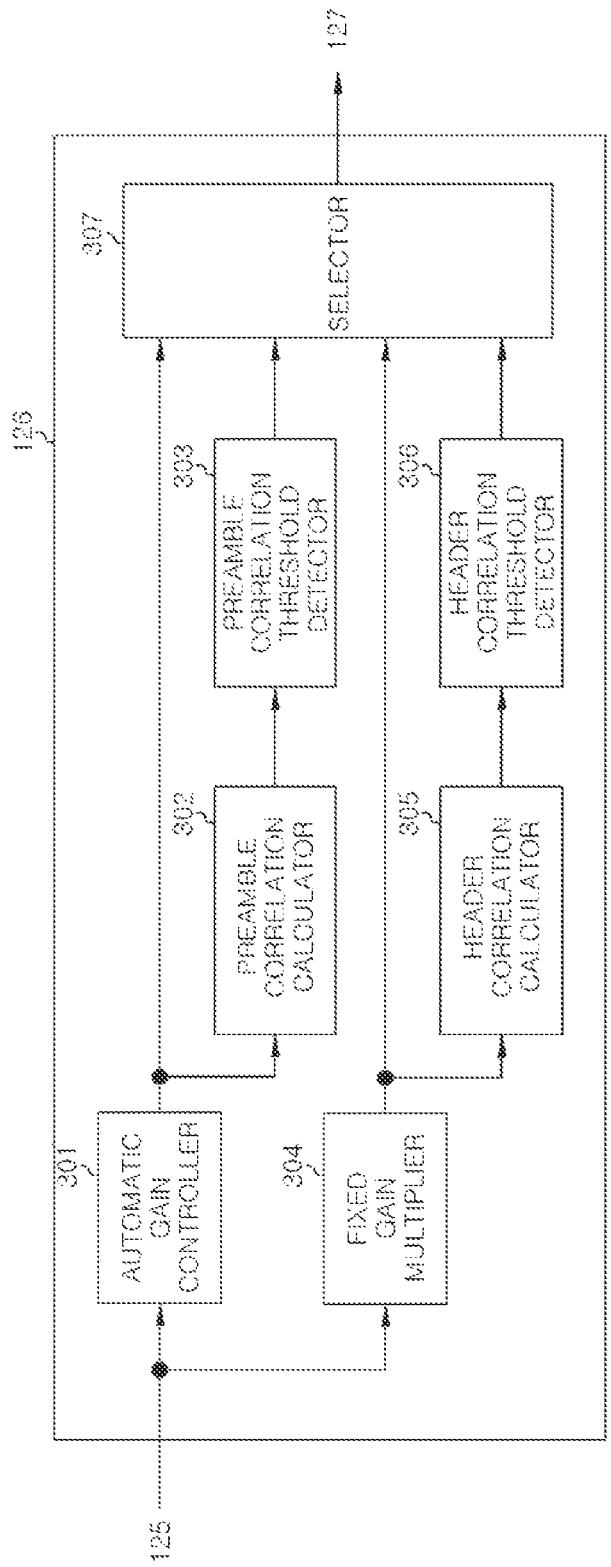
FIG. 4 shows a configuration example of a reception power controller in the first embodiment.

The reception power controller 126 will be described in detail with reference to FIG. 4. As shown in FIG. 4, the reception power controller 126 in this example includes an automatic gain controller 301, a preamble correlation calculator 302, a preamble correlation threshold detector 303, a fixed gain multiplier 304, a header correlation calculator 305, a header correlation threshold detector 306, and a selector 307.

The automatic gain controller 301 calculates the difference between the power of the inputted reception signal and the target power, multiplies the reception signal by the differential gain, and outputs the result to the preamble correlation calculator 302 and the selector 307. The target power is set such that the demodulation can be appropriately performed on the reception side.

The preamble correlation calculator 302 performs correlation calculation between the output signal of the automatic gain controller 301 and the preamble signal, and outputs the correlation value to the preamble correlation threshold detector 303.

The preamble correlation threshold detector 303 performs peak detection of the correlation value calculated by the preamble correlation calculator 302, determines whether or not the detected peak value exceeds a preset threshold, and outputs the determination result to the selector 307. The case in which the peak value exceeds the threshold means that the preamble signal as well as the frame timing were detected by synchronous acquisition. The case in which the peak value does not exceed the threshold means that the preamble signal was not detected.

The fixed gain multiplier 304 outputs the reception signal multiplied by a predetermined gain value (e.g., 10 dB) or the gain value calculated by the automatic gain controller 301 in the previous frame to the header correlation calculator 305 and the selector 307. In this example, if the gain value has been calculated by the automatic gain controller 301 in the previous frame, the gain value is multiplied by the transmission signal. Otherwise, the transmission signal is multiplied by the predetermined gain value. The predetermined gain value used in the fixed gain multiplier 304 and the predetermined gain value used in the fixed transmission gain multiplier 202 of the transmitter may be the same or may be different.

The header correlation calculator 305 performs correlation calculation on the header leading signal of the pattern that can be applied to the output signal of the fixed gain multiplier 304, and outputs the correlation value for each pattern to the header correlation threshold detector 306. The header leading signal is a signal of several leading blocks in the parameter detection signal of each pattern that can be set in the header signal block. The output signal of the fixed gain multiplier 304 may be subjected to correlation calculation with the parameter detection signal itself.

The header correlation threshold detector 306 performs peak detection of the correlation value calculated by the header correlation calculator 305, determines whether or not the detected peak value exceeds a preset threshold, and output the determination result to the selector 307. The case in which the peak value exceeds the threshold means that a header leading signal of any pattern as well as the frame timing were detected by synchronization acquisition. The case in which the peak value does not exceed the threshold means that the header leading signal of any pattern was not detected. The threshold used in the header correlation threshold detector 306 is the same value as the threshold used in the preamble correlation threshold detector 303.

The selector 307 selects a demodulation processing input signal to be outputted to the parameter detector 127 based on the determination result of the preamble correlation threshold detector 303 and the determination result of the header correlation threshold detector 306.

Figure 5:
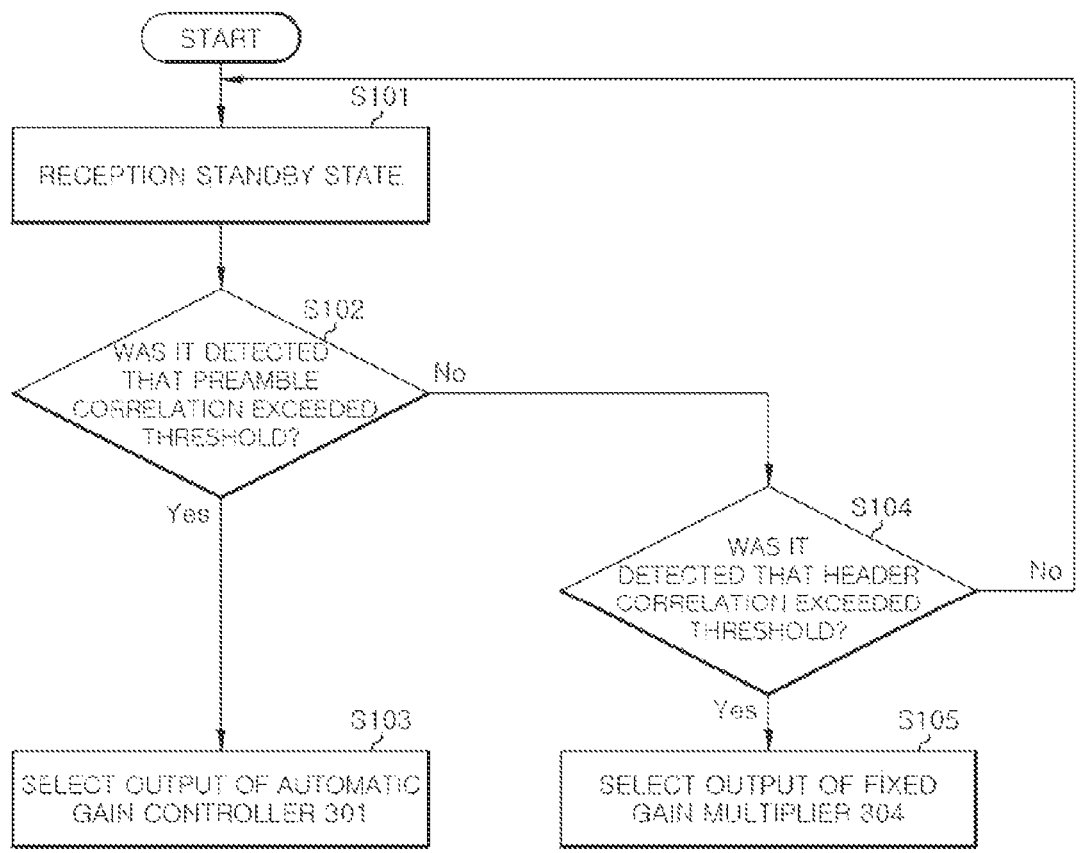
FIG. 5 shows an example of a method for selecting a demodulation processing input signal in the first embodiment.

FIG. 5 shows an example of a flowchart of a process for selecting a demodulation process input signal. The selector 307 determines whether or not a preamble signal is detected based on the determination result of the preamble correlation threshold detector 303 in a reception standby state (steps S101 and S102). When the preamble signal is detected, the selector 307 selects the output signal of the automatic gain controller 301 as the demodulation processing input signal (step S103). On the other hand, when the preamble signal is not detected, the selector 307 determines whether or not the header leading signal is detected based on the determination result of the header correlation threshold detector 306 (step S104). When the header leading signal is detected, the selector 307 selects the output signal of the fixed gain multiplier 304 as the demodulation processing input signal (step S105). If the preamble signal is not detected and the header leading signal is not detected, the processing returns to the reception standby state (step S101).

The parameter detector 127 detects a parameter such as a data block modulation method, an interleave size, or the like from the header signal block included in the frame of the output signal (i.e., demodulation processing input signal selected by the selector 307) from the reception power controller 126. The detected parameter is outputted to the demodulator 128.

Based on the inputted parameter, the demodulator 128 performs demodulation processing such as channel equalization or the like on a data symbol block included in the frame of the output signal from the reception power controller 126, and calculates a demodulation log-likelihood ratio or a demodulation bit (hereinafter, referred to as "demodulation signal"). The calculated demodulation signal is outputted to the deinterleaver 128.

The deinterleaver 129 performs deinterleaving processing on the inputted demodulation signal to restore the order of the signal sequence rearranged in the interleaves 102 to the same order as the original coding bit sequence. The demodulation signal sequence obtained by the deinterleaving (processing) is outputted to the error correction decoder 130.

The error correction decoder 130 performs error correction processing on the inputted demodulation signal sequence. The decoding bit sequence (transmission data) obtained by the error correction processing is outputted to the upper layer.

As described above, in the wireless communication system according to the first embodiment, the transmission power controller 106 of the transmission part performs the following processing. In other words, the automatic transmission gain controller 201 multiplies the transmission signal by the gain value which is equivalent to the difference between the power of the signal looped back from the power amplifier 109 and the power of the transmission signal. The fixed transmission gain multiplier 202 multiplies the transmission signal by a predetermined gain value or the gain value used in the automatic transmission gain controller 201 in the previous frame. The selector 203 selects the transmission signal whose gain has been controlled by the automatic transmission gain controller 201 when the preamble signal block is included in the frame of the transmission signal, and selects the transmission signal whose gain has been controlled by the fixed transmission gain multiplier 202 when the preamble signal block is not included in the frame of the transmission signal.

Further, the reception power controller 126 of the reception part performs the following processing. In other words, the automatic gain controller 301 multiplies the reception signal by the gain value which is equivalent to the difference between the power of the reception signal and the target power. The preamble correlation calculator 302 performs correlation calculation between the preamble signal and the reception signal whose gain has been controlled by the automatic gain controller 301. The preamble correlation threshold detector 303 determines whether or not the peak of the correlation value calculated by the preamble correlation calculator 302 exceeds a predetermined threshold. The fixed gain multiplier 304 multiplies the reception signal by a predetermined gain value or the gain value used in the automatic gain controller 301 in the previous frame. The header correlation calculator 305 performs correlation calculation on the reception signal whose gain has been controlled by the fixed gain multiplier 304 and the parameter detection signal. The header correlation threshold detector 306 determines whether or riot the peak correlation value calculated by the header correlation calculator 305 exceeds a predetermined threshold. When the preamble correlation threshold detector 303 determines that the peak of the correlation value calculated by the preamble correlation calculator 302 exceeds the predetermined threshold, the selector 307 selects the reception signal whose gain has been controlled by the automatic gain controller 301. When the header correlation threshold detector 306 determines that the peak of the correlation value calculated by the header correlation calculator 305 exceeds the predetermined threshold, the selector 307 selects the reception signal whose gain has been controlled by the fixed gain multiplier 304.

In accordance with the first embodiment described, even when the preamble signal block is not included in the frame, it is possible to appropriately perform transmission gain control and reception gain control using the predetermined gain value or the gain value in the previous frame.

Figure 6:
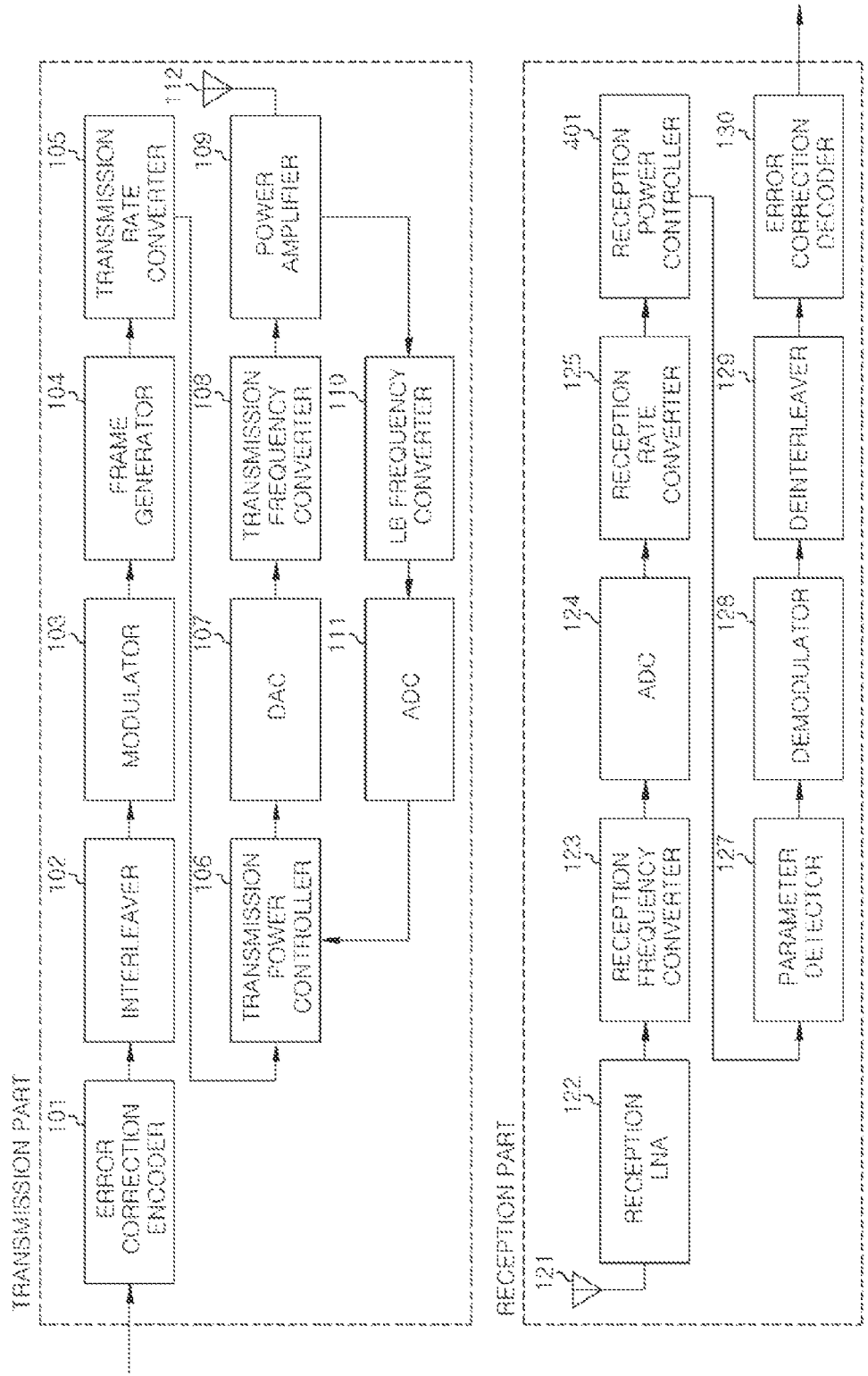
FIG. 6 shows a configuration example of a transmission part and a reception part of a wireless communication system according to the second embodiment.

FIG. 6 shows a configuration example of a transmitter and a receiver of a wireless communication system according to a second embodiment of the present disclosure. The wireless communication system according to the second embodiment has the same basic configuration as that of the wireless communication system according to the first embodiment, but is different in that a reception power controller 401 is provided instead of the reception power controller 126. Other functional blocks 101-111, 121-125, and 127-130 are the same as those of the first embodiment, so that the description thereof will be omitted.

The reception power controller 401 calculates the power of the reception signal, calculates the gain for achieving a prescribed target power, and multiplies the reception signal by the gain in order to perform the subsequent processing at a constant signal level. The reception signal whose power has been controlled is outputted to the parameter detector 127.

Figure 7:
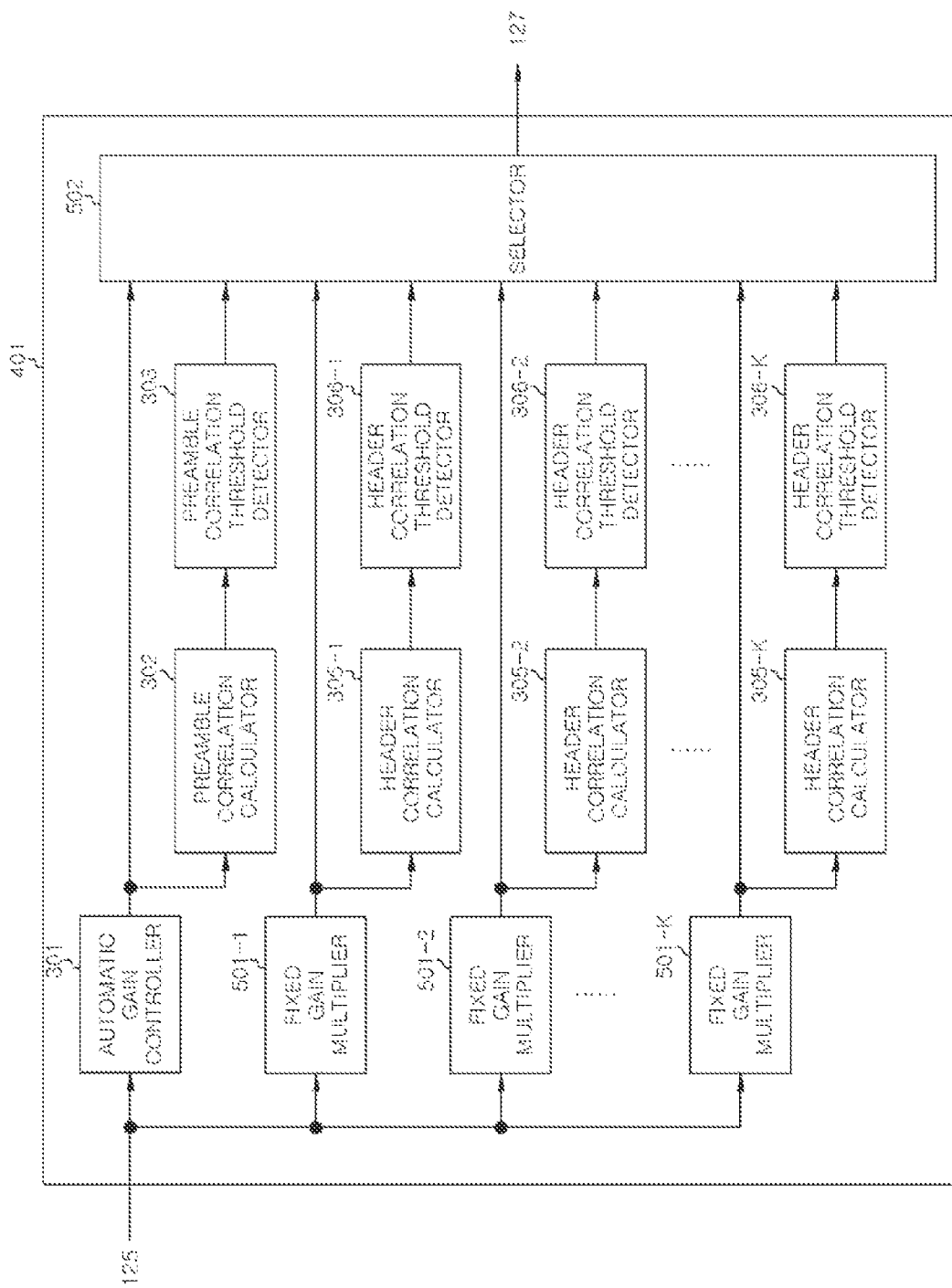
FIG. 7 shows a configuration example of a reception power controller in the second embodiment.

The reception power controller 401 will be described in detail with reference to FIG. 7. As shown in FIG. 7, the reception power controller 401 in this example includes the automatic gain controller 301, the preamble correlation calculator 302, the preamble correlation threshold detector 303, a fixed gain multiplier 501, the header correlation calculator 305, a header correlation threshold detector 306, and a selector 502. A plurality of systems (K-number of systems in this example) of the fixed gain multiplier 501, the header correlation calculator 305, and the header correlation threshold detector 306 are provided, and they are distinguished by a subscript k (k=1, 2, ..., K). The automatic gain controller 301, the preamble correlation calculator 302, the preamble correlation threshold detector 303, the header correlation calculator 305, and the header correlation threshold detector 306 are the same as those in the first embodiment, so that the description thereof will be omitted.

Different gain values are prescribed in advance in fixed gain multipliers 501-1 to 501-K. For example, a $k^{th}$ largest gain value is set at intervals of 10 dB for a $k^{th}$ fixed gain multiplier 501-$k$. The $k^{th}$ fixed gain multiplier 501-$k$ outputs the reception signal multiplied by its own prescribed gain value to a $k^{th}$ header correlation calculator 305-$k$ and the selector 502.

The selector 502 selects a demodulation processing input signal to be outputted to the parameter detector 127 based on the determination result of the preamble correlation threshold detector 303 and the determination results of header correlation threshold detectors 306-1 to 306-K.

Figure 8:
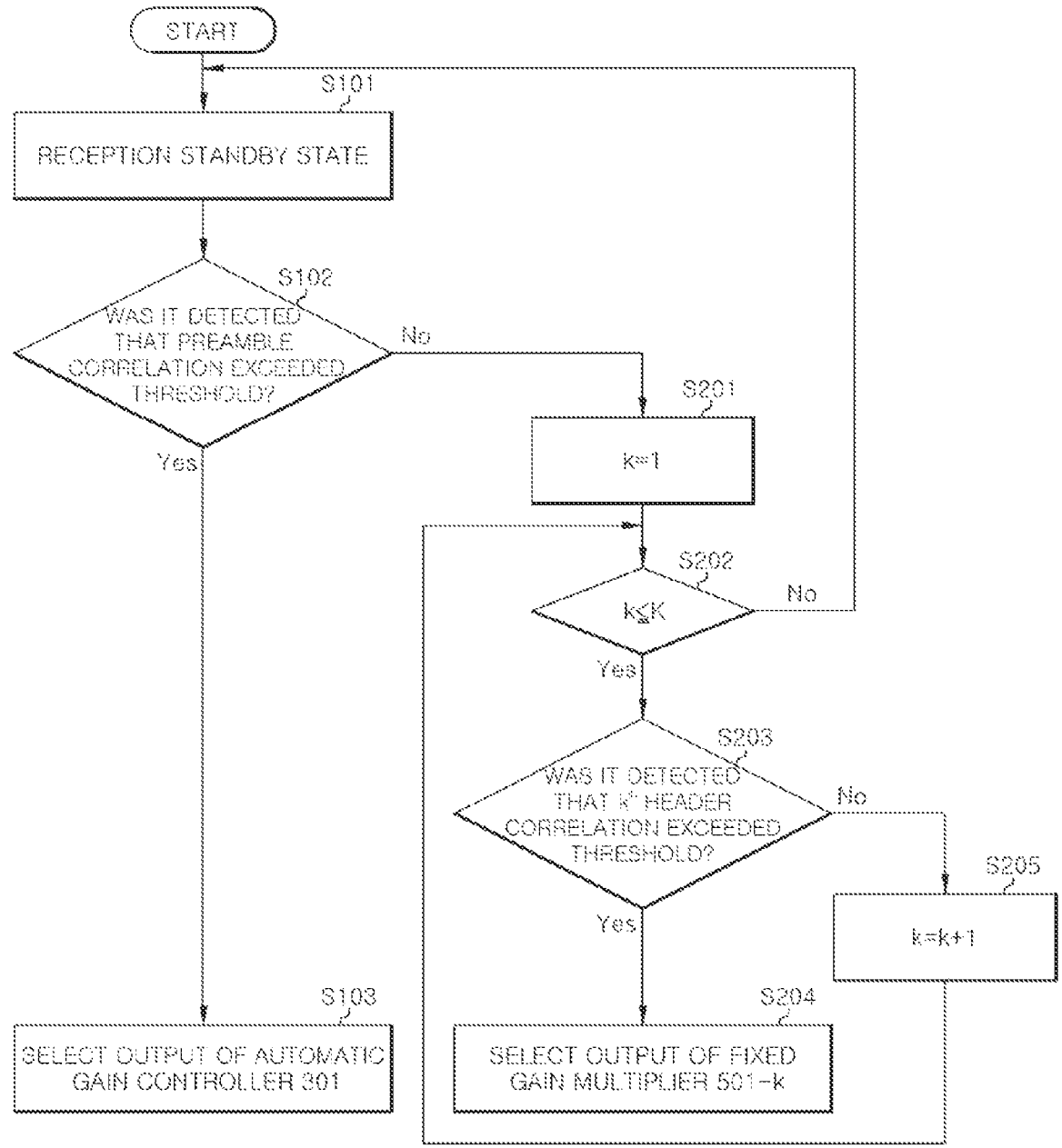
FIG. 8 shows an example of a method for selecting a demodulation processing input signal in the second embodiment.

FIG. 8 shows an example of a flowchart of a process for selecting a demodulation process input signal. The selector 502 determines whether or not a preamble signal is detected based on the determination result of the preamble correlation threshold detector 303 in the reception standby state (steps S101 and S102). When the preamble signal is detected, the selector 502 selects the output signal of the automatic gain controller 301 as the demodulation processing input signal (step S103). On the other hand, when the preamble signal is not detected, the selector 502 sequentially refers to the determination results of the header correlation threshold determination parts 306-1 to 306-K.

Specifically, first, the selector 502 initializes a variable k (sets a variable k to 1) (step S201). Next, the selector 502 determines whether or not the variable k is smaller than or equal to a constant K (step S202). Next, the selector 502 determines whether or not the header leading signal is detected based on the determination result of the $k^{th}$ header correlation threshold detector 306-$k$ (step S203). When the header leading signal is detected, the selector 502 selects the output signal of the $k^{th}$ fixed gain multiplier 501-$k$ as the demodulation processing input signal (step S204). When the header leading signal is not detected, the variable k is incremented (1 is added to the variable k) (step S205), and the processing returns to step S202. If the variable k is greater than the constant K, that is, if no header leading signal is detected, the processing returns to the reception standby state (step S101).

As described above, in the wireless communication system according to the second embodiment, the reception power controller 401 of the reception part performs the following processing. In other words, the automatic gain controller 301 multiplies the reception signal by the gain value which is equivalent to the difference between the power of the reception signal and the target power. The preamble correlation calculator 302 performs correlation between the reception signal whose gain has been controlled by the automatic gain controller 301 and the preamble signal. The preamble correlation threshold detector 303 determines whether or not the peak of the correlation value calculated by the preamble correlation calculator 302 exceeds a predetermined threshold. The $k^{th}$ fixed gain multiplier 501-$k$ multiplies the reception signal by a $k^{th}$ predetermined Gain value or the gain value used by the automatic gain controller 301 in the previous frame. The $k^{th}$ header correlation calculator 305-$k$ performs correlation calculation between the reception signal whose gain has been controlled by the $k^{th}$ fixed gain multiplier 501-$k$ and the parameter detection signal. The $k^{th}$ header correlation threshold detector 306-$k$ determines whether or not the peak correlation value calculated by the $k^{th}$ header correlation calculator 305-$k$ exceeds a predetermined threshold. When the preamble correlation threshold detector 303 determines that the peak of the correlation value calculated by the preamble correlation calculator 302 exceeds the predetermined threshold, the selector 307 selects the reception signal whose gain has been controlled by the automatic gain controller 301. Further, when the $k^{th}$ header correlation threshold detector 306-$k$ determines that the peak of the correlation value calculated by the $k^{th}$ header correlation calculator 305-$k$ exceeds the predetermined threshold, the selector 307 selects the reception signal whose gain has been controlled by the $k^{th}$ fixed gain multiplier 501-$k$.

In accordance with the second embodiment, even when a frame does not include a preamble signal block, it is possible to more appropriately perform transmission gain control and reception gain control using the gain value in the previous frame or a plurality of predetermined gain values.

While the embodiments of the present disclosure have been described, the present disclosure is not limited to the configurations described herein, and may be widely applied to systems having other configurations.

The present disclosure may also be provided as, e.g., a method including technical procedures related to the above processing, a program for causing a processor to execute the above processing, a storage medium storing such a program in a computer-readable manner, or the like.

The scope of the present disclosure is not limited to the illustrated and described exemplary embodiments, but also includes all embodiments that provide effects equivalent to those intended by the present disclosure. Moreover, the scope of the present disclosure may be defined by any desired combination of specific features of all the disclosed features.

INDUSTRIAL APPLICABILITY

The present disclosure can be used in a wireless communication system that performs wireless communication using a frame in which it is possible to select whether or not a preamble signal block is included.

DESCRIPTION OF REFERENCE NUMERALS

101: error correction encoder
102: interleaver
103: modulator
104: frame generator
105: transmission rate converter
106: transmission power controller
107: DAC
108: transmission frequency converter
109: power amplifier
110: LB frequency converter
111: ADC
112: transmission antenna
121: reception antenna
122: reception LNA
123: reception frequency converter
124: ADC
125: reception rate transformer
126: reception power controller
127: parameter detector
128: demodulator
129: deinterleaver
130: error correction decoder
201: automatic transmission gain controller
202: fixed transmission gain multiplier
203: selector
301: automatic gain controller
302: preamble correlation calculator
303: preamble correlation threshold detector
304: fixed gain multiplier
305: header correlation calculator
306: header correlation threshold detector
307: selector
401: reception power controller
501: fixed gain multiplier
502: selector

The invention claimed is:

1. A wireless communication system, in which a transmitter and a receiver perform wireless communication using a frame capable of selecting whether or not a preamble signal block for storing a preamble signal used for gain control is included therein,
wherein the transmitter comprises:
an automatic transmission gain controller configured to multiply a transmission signal by a gain value which is equivalent to a difference between a power of a signal looped back from a power amplifier of the transmitter and a power of a transmission signal,
a fixed transmission gain multiplier configured to multiply the transmission signal by a predetermined gain value or a gain value used by the automatic transmission gain controller for a previous frame, and
a transmission signal selector configured to select a transmission signal whose gain has been controlled by the automatic transmission gain controller when a frame of the transmission signal include a preamble signal block, and to select a transmission signal whose gain has been controlled by the fixed transmission gain multiplier when the frame of the transmission signal includes no preamble signal block, and
wherein the receiver comprises:
an automatic gain controller configured to multiply a reception signal by a gain value which is equivalent to a difference between a power of the reception signal and a target power,
a fixed gain multiplier configured to multiply the reception signal by a predetermined gain or a gain value used by the automatic gain controller for the previous frame, and
a reception signal selector configured to select a reception signal whose gain has been controlled by the automatic gain controller when a frame of the reception signal includes a preamble signal block, and to select a reception signal whose gain has been controlled by the fixed gain multiplier when the frame of the reception signal includes no preamble signal block.

2. The wireless communication system of claim 1, wherein the receiver further comprises:
a preamble correlation calculator configured to perform correlation calculation between a preamble signal and the reception signal whose gain has been controlled by the automatic gain controller, and
a preamble correlation threshold detector configured to determine whether or not a peak of a correlation value calculated by the preamble correlation calculator exceeds a predetermined peak, and
wherein the reception signal selector selects the reception signal whose gain has been controlled by the automatic gain controller when the preamble correlation threshold detector determines that the peak of the correlation value calculated by the preamble correlation calculator exceeds a predetermined threshold.

3. The wireless communication system of claim 2, wherein the frame further includes a header signal block in which a parameter detection signal of a predetermined pattern is stored,
wherein the receiver comprises:
a header correlation calculator configured to perform correlation calculation between the reception signal whose gain has been controlled by the fixed gain multiplier and a parameter detection signal, and
a header correlation threshold detector configured to determine whether or not a peak of a correlation value calculated by the header correlation calculator exceeds a predetermined threshold, and
wherein the reception signal selector selects the reception signal whose gain has been controlled by the fixed gain multiplier when the header correlation threshold detector determines that the peak of the correlation value calculated by the header correlation calculator exceeds the predetermined threshold.

4. The wireless communication system of claim 3, wherein the receiver comprises:
K-number of fixed gain multipliers having different predetermined gain values, and K-number of header correlation calculators and K-number of header correlation threshold detectors respectively corresponding to the K-number of fixed gain multipliers, and wherein the reception signal selector selects a reception signal whose gain has been controlled by a kth (k=1 to M) fixed gain multiplier when a kth header correlation threshold detector determines that a peak of a correlation value calculated by a kth header correlation calculator exceeds a predetermined threshold.

5. A transmission method in which a transmitter transmits a signal to a receiver using a frame capable of selecting whether or not a preamble signal block for storing a preamble signal used for gain control is included therein, wherein the transmitter performs gain control in which a transmission signal is multiplied by a gain value which is equivalent to a difference between a power of a signal looped back from a power amplifier of the transmitter and a power of a transmission signal when a frame of the transmission signal includes a preamble signal block, and performs gain control in which a transmission signal is multiplied by a predetermined gain value or a gain value used for gain control of a transmission signal in a previous frame when the frame of the transmission signal includes no preamble signal block.

6. A reception method in which a receiver receives a signal transmitted from a transmitter using a frame capable of selecting whether or not a preamble signal block that stores a preamble signal used for gain control is included therein, wherein the receiver performs gain control in which a reception signal is multiplied by a gain value which is equivalent to a difference between a power of the reception signal and a target power when a frame of the reception signal includes a preamble signal block, and performs gain control in which a reception signal is multiplied by a predetermined gain value or a gain value used for gain control of a reception signal in a previous frame when the frame of the reception signal includes no preamble signal block.

7. The wireless communication system of claim 1, wherein the frame further includes a header signal block in which a parameter detection signal of a predetermined pattern is stored, wherein the receiver comprises:

a header correlation calculator configured to perform correlation calculation between the reception signal whose gain has been controlled by the fixed gain multiplier and a parameter detection signal, and a header correlation threshold detector configured to determine whether or not a peak of a correlation value calculated by the header correlation calculator exceeds a predetermined threshold, and wherein the reception signal selector selects the reception signal whose gain has been controlled by the fixed gain multiplier when the header correlation threshold detector determines that the peak of the correlation value calculated by the header correlation calculator exceeds the predetermined threshold.

8. The wireless communication system of claim 7, wherein the receiver comprises:

K-number of fixed gain multipliers having different predetermined gain values, and K-number of header correlation calculators and K-number of header correlation threshold detectors respectively corresponding to the K-number of fixed gain multipliers, and wherein the reception signal selector selects a reception signal whose gain has been controlled by a kth (k=1 to M) fixed gain multiplier when a kth header correlation threshold detector determines that a peak of a correlation value calculated by a kth header correlation calculator exceeds a predetermined threshold.

* * * * *